United States Patent
Billon

(12) 
(10) Patent No.: US 6,490,442 B1
(45) Date of Patent: Dec. 3, 2002

(54) PRO-ACTIVE ESTIMATION OF INTERFERENCE SIGNAL RATIO IN A RADIOCOMMUNICATION CELLULAR NETWORK

(76) Inventor: Thierry Billon, 9, rue des Pavillons, 92800 Puteaux (FR)

( * ) Notice: Subject to any disclaimer, the term of this patent is extended or adjusted under 35 U.S.C. 154(b) by 0 days.

(21) Appl. No.: 09/486,922
(22) PCT Filed: Sep. 11, 1998
(86) PCT No.: PCT/FR98/01951
§ 371 (c)(1), (2), (4) Date: Jul. 13, 2000
(87) PCT Pub. No.: WO99/14968
PCT Pub. Date: Mar. 25, 1999

(30) Foreign Application Priority Data

Sep. 12, 1997 (FR) .............................. 97 11467

(51) Int. Cl.[7] .................................. H04B 17/00
(52) U.S. Cl. ................... 455/226.1; 455/67.1; 455/446; 455/63
(58) Field of Search ................ 455/226.1, 226.2, 455/67.1, 226.3, 446, 447, 450, 449, 63

(56) References Cited

U.S. PATENT DOCUMENTS 5,241,603 A  * 8/1993  Akagiri et al. ................ 381/37
5,711,007 A  * 1/1998  Lin et al. ..................... 455/447
5,734,983 A  * 3/1998  Faruque ....................... 455/450
5,995,840 A  * 11/1999 Dorenbosch et al. ........ 455/447
6,178,328 B1 * 1/2001  Tang et al. .................. 445/447

* cited by examiner

Primary Examiner—Thanh Cong Le
Assistant Examiner—Lana Le
(74) Attorney, Agent, or Firm—Lee, Mann, Smith, McWilliams, Sweeney & Ohlson

(57) ABSTRACT

A system for provisionally estimating the carrier-to-interference ratio of a terminal in a cellular mobile radio network which transmits sets of primary frequencies and sets of secondary frequencies and in which the rate of re-use of the sets of secondary frequencies is higher than that of the sets of primary frequencies. The system knows the level received by said terminal from a local cell (A1) to which it is connected. It also knows the levels (LB2, LC3, LD2, LE1, LG2, LF1) received by said terminal from adjoining cells (B2, C3, D2, E1, G2, F1). It selects a reference cell (B2) from said local cell and said adjoining cells, produces a potential noise by calculating the sum (N1) of the levels (LD2, LG2) received from the cells (D2, G2) using the same secondary frequencies as said reference cell (B2), and supplies said estimate in the reference cell (B2) by dividing the level received from said reference cell by the potential noise.

9 Claims, 1 Drawing Sheet

Figure 1:
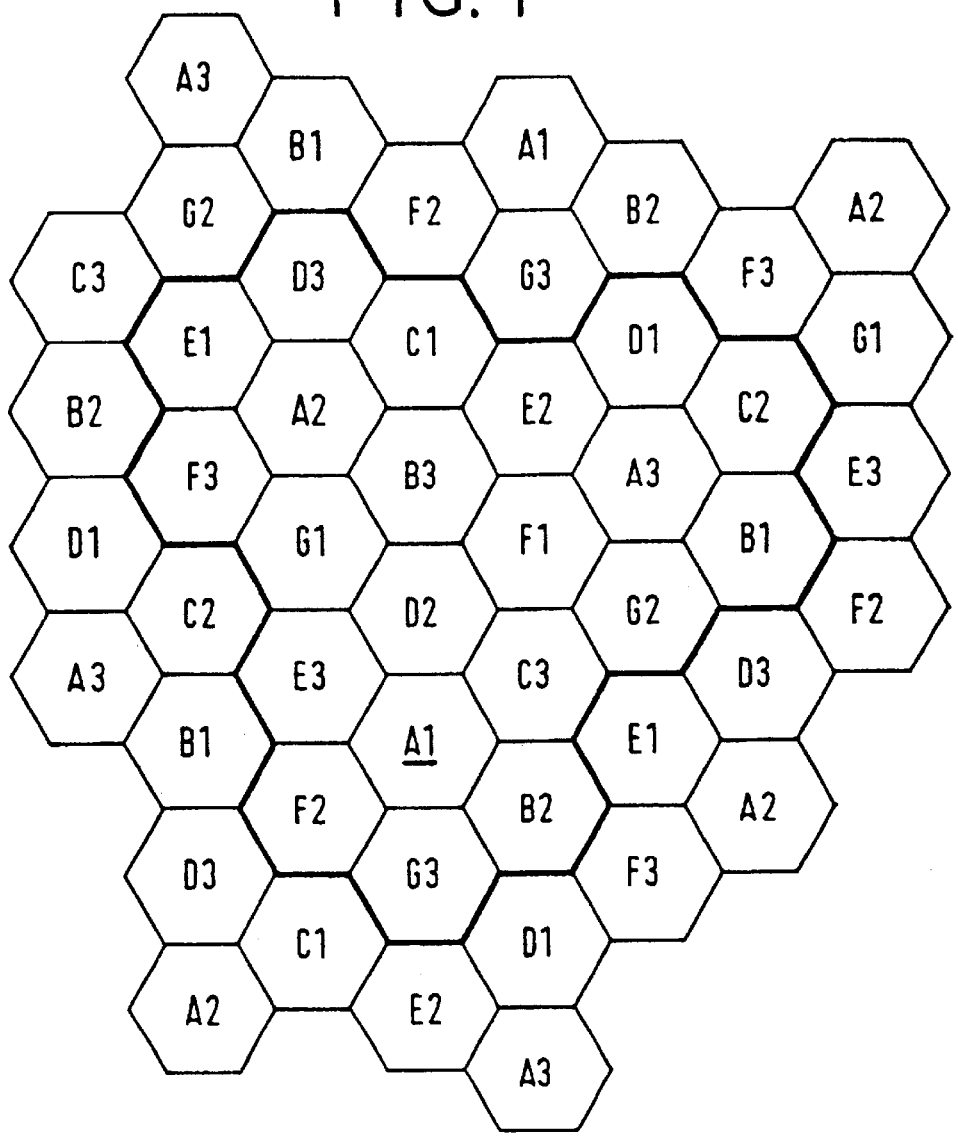

PRO-ACTIVE ESTIMATION OF INTERFERENCE SIGNAL RATIO IN A RADIOCOMMUNICATION CELLULAR NETWORK

The present invention relates to a system for providing a provisional estimate of the carrier-to-interference ratio of the link between a terminal and a cellular mobile radio network.

One typical example of a cellular network is the GSM, now in widespread use. To simplify the following description, specific reference will be made to the GSM, but this is not limiting on the scope of the invention.

The field of the invention is therefore that of cellular networks. A cell uses transmission frequencies which are not used in any of the cells which are its near neighbors. Using the standard hexagonal representation of cells, any cell has six near neighbors.

In GSM networks, each cell has a beacon frequency referred to as the BCCH and used in particular to set up the initial connection from a terminal to the network, i.e. to convey signaling information required by the terminal as soon as it is switched on. It is well understood that the beacon frequencies broadcast by the various cells must provide overall coverage of a network under worst case propagation conditions. This means that a terminal must be able to receive at least one beacon frequency satisfactorily regardless of its location. Networks are therefore designed so that the beacon frequencies provide a suitable quality of service in all circumstances.

It is therefore standard practice to employ a re-use pattern of twelve or even more cells for these beacon frequencies. To simplify the description of the invention, a pattern with seven cells is used here: a separate beacon frequency is allocated to each of the cells forming a pattern made up of a central cell and its six nearest neighbors. The most reliable solution, in terms of network operation, is naturally to use the same pattern of seven cells for all the available frequencies, and in particular for the traffic frequencies used for calls.

However, if the pattern with seven cells is applied to all the frequencies used in the network, the required number of calls in a cell cannot be supported. This is because the number of calls on each frequency is a network constant (with a value of one in FDMA systems or eight in the GSM). Also, the number of frequencies available in a cell falls as the rate of re-use falls. The rate of re-use is defined as the reciprocal of the number of cells in the re-use pattern.

The need to use a pattern with a higher rate of re-use for at least some traffic frequencies has therefore become apparent. A pattern with four cells has been used. A pattern with three cells has also been used, and has the highest rate of re-use in a cellular architecture where the use of the same frequency in two adjacent cells is prohibited. The pattern with three cells is formed by three adjacent hexagons having a common apex.

It follows from the foregoing considerations that the frequencies used in the network can be divided into primary frequencies and secondary frequencies. The primary frequencies, which conform to the pattern of re-use with seven cells, provide the required high quality of service and the secondary frequencies, which conform to a pattern with a higher rate of re-use, for example $\frac{1}{3}$, increase the volume of calls.

Any cell therefore has a set of primary frequencies and a set of secondary frequencies and each set comprises at least one frequency. The beacon frequency of a cell naturally belongs to its set of primary frequencies. For convenience, a cell is identified by a primary color and a secondary color which respectively correspond to the set of primary frequencies and to the set of secondary frequencies allocated to it.

As in any transmission system, the carrier-to-interference ratio is an essential piece of data for qualifying the link between a terminal and the network. The GSM uses an indicator RXQUAL which represents a quantified value of the estimated error rate of the link and has a low dynamic range.

Among other things, the carrier-to-interference ratio is used during handover. If the link between the terminal and the cell to which it is connected is degraded, it is necessary to search for a new cell that can provide a new link with the terminal of better quality than the old link.

The carrier-to-interference ratio is also used when the network enables power regulation. The higher this ratio, the lower the power at which the signal can be transmitted over the link.

The carrier-to-interference ratio is representative of the quality of a link between the terminal and the network already set up at a given time. It does not allow for possible changes in the network, in particular the load on the network and any consequential deterioration of the link. It is important to have reliable data on potential deterioration of a link which is already set up or the quality that may be expected of a new link replacing the previous link.

The object of the present invention is therefore to provide a system for provisionally estimating the carrier-to-interference ratio in a cellular mobile radio network.

The system of the invention is used in a cellular mobile radio network which transmits sets of primary frequencies and sets of secondary frequencies and in which the rate of re-use of the sets of secondary frequencies is higher than that of the sets of primary frequencies. Each cell is identified by a primary color and a secondary color respectively corresponding to the set of primary frequencies and to the set of secondary frequencies allocated to it. The system knows the level received by said terminal from a local cell to which it is connected and the levels received by said terminal from adjoining cells whose primary color is different to that of said local cell. It selects a reference cell from said local cell and said adjoining cells, produces a potential noise including the sum of said levels received from the cells with the same secondary color as said reference cell, without taking account of the level received from that reference cell, determines a noise level by summing said potential noise and a noise floor subject to a weighting coefficient, and supplies the provisional estimate of the carrier-to-interference ratio of the terminal in the reference cell by dividing the level received from that reference cell by the noise level.

As soon as it is connected, and even if it is in standby mode, the terminal periodically measures the level of the signal received from the local cell. It also measures the level received on primary frequencies indicated to it by the network. Those primary frequencies are generally the beacon frequencies of the adjoining cells which can take over from the local cell in the event of handover. In the GSM, the terminal retransmits the level of the signal received from the local cell and that from the six best adjoining cells of the network, although it performs measurements on a greater number of frequencies.

It is routinely assumed that to a first approximation the main source of interference on a link consists of other links using the same frequency. When the network is loaded to the maximum, and if power regulation is not employed, i.e. under worst case conditions, the terminal receives a secondary frequency and a primary frequency from any cell at an equivalent level. Accordingly, for a reference cell, the interference as seen from the terminal can be represented by the sum of the levels received from other cells which use the same secondary frequencies as the reference cell.

To improve the estimate, if the system also knows the levels received by the terminal from surrounding cells identified as using secondary frequencies adjacent those used by the reference cell, the network being designed so that a received adjacent frequency is allocated a predetermined attenuation coefficient, the potential noise is increased by the product of said attenuation coefficient and the sum of the levels received from said surrounding cells.

It is desirable to refine the preceding approximation because, even if the main source of interference on a defined link consists of other links using the same frequency, another and non-negligible source of interference consists of different links using an adjacent frequency.

It can happen that none of the measurements used by the system according to the invention concern cells using the same set of secondary frequencies as the reference cell or adjacent frequencies. In this situation, it is unrealistic to consider that there is no interference. It is therefore necessary to fix a noise floor. The simplest solution is to choose for the noise floor a predetermined value below which it is extremely unlikely that the interference will fall.

The weighting coefficient is preferably zero if the sum of the levels received from the adjoining cells with the same secondary color as the reference cell is non-zero.

In contrast, the weighting coefficient is preferably non-zero if the sum of the levels received from the adjoining cells with the same secondary color as the reference cell is zero.

The system therefore provides an estimate of what the carrier-to-interference ratio in the reference cell could become if the network were to operate under poor conditions, independently of the intrinsic quality of the link(s) on which the terminal measures the level.

Another and advantageous solution for fixing the noise floor is to assign it a value equal to the lowest of the levels received by the terminal, excluding the level received from the reference cell.

According to an additional feature of the invention, if the network provides a separate beacon frequency in each set of primary frequencies, the level received from one of the adjoining cells is measured on the beacon frequency allocated to it.

The level received from an adjoining cell is preferably identified by the primary color and the secondary color of that cell.

This resolves the ambiguity as to the identity of the adjoining cell from which the terminal is receiving.

The system can be part of the terminal or part of the network.

Figure 2:
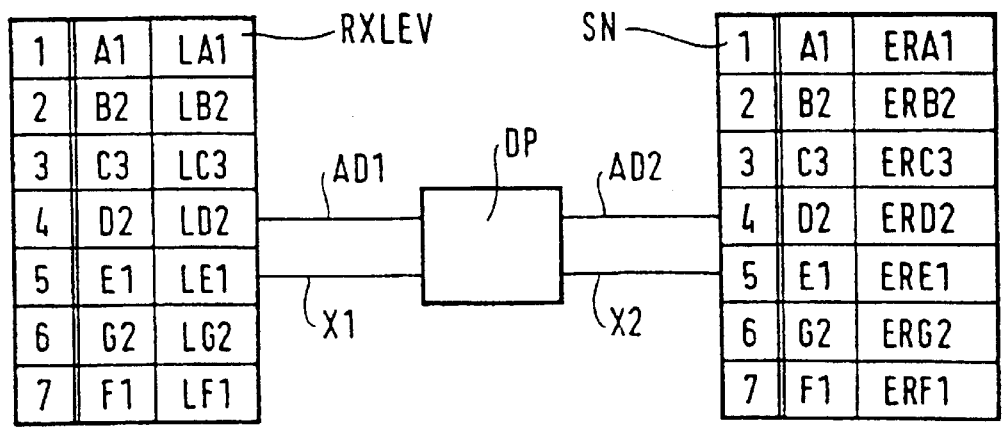

The present invention emerges more explicitly from the following description of an embodiment of the invention, which is given by way of illustrative example and with reference to the accompanying drawings, in which:

FIG. 1 is a block diagram showing part of a network, and
FIG. 2 is a block diagram of the system.

The description of the invention given hereinafter with reference to FIG. 1 refers to a hexagonal representation of a cellular network.

The sets of primary frequencies follow a pattern of re-use with seven cells. Each set is identified by a letter from A to G and comprises at least one frequency, the BCCH frequency in the case of the GSM. The sets of secondary frequencies conform to a pattern of re-use with three cells. Each set is identified by a digit from 1 to 3 and comprises at least one frequency, generally a traffic frequency.

Each cell can therefore be identified by a primary color (a letter) and a secondary color (a digit) which respectively represent the set of primary frequencies and the set of secondary frequencies allocated to the cell.

The combination of the two patterns of re-use defines a new pattern with twenty-one cells, outlined with a thicker line in the figure. The required coverage of the network is obtained by repeating the new pattern in translation.

Assume that a terminal is listed in the cell A1 which is part of the pattern with twenty-one cells outlined with a thicker line. The cell A1 is therefore the local cell of the terminal, which is either in call mode or in standby mode.

Regardless of the mode in which the terminal is operating, it periodically measures the level LA1 of the signal received from the local cell A1. In standby mode, that signal is generally the signal which maintains the connection between the terminal and the network, in particular in the event of a call request; in the GSM, it would be a signaling channel referred to as the SDCCH.

Moreover, at the request of the network, and in particular to prepare for handover in the event of failure of the link with the local cell, the terminal measures the level received from some identified neighboring cells on one of the frequencies of the set of primary frequencies B, C, D, E, F, G allocated to them. In the case of the GSM, that frequency is preferably the BCCH frequency. With reference to radio propagation conditions, the concept of adjoining cells must be understood in a very broad sense. The cells concerned are in fact those which are received best. It is further apparent that the cell could itself analyze the adjoining cells without the network instructing it to do so.

Note that the first rank cells geographically nearest the local cell are designated B2, C3, D2, E3, F2 and G3. Note also that, because of the structure of the network, there are twelve second rank cells adjacent the first rank cells and they are designated B1, D3, C1, E2, D1, F3, E1, G2, F1, B3, G1 and C2. Thus none of the eighteen first or second rank cells has the same primary color and the same secondary color as any other cell. On the other hand, of those eighteen cells, six triplets have the same primary color.

The problem therefore arises of knowing whether the signal received on a primary frequency, for example that of the set F, comes from the nearest cell F2 or from one of the second rank cells F1, F3. This is because there may be an obstacle to propagation between the terminal and any of the three cells F1, F2, F3.

A simple solution to this problem is to have the cells broadcast their secondary color on the primary frequency to be evaluated by the terminal, enabling the terminal to identify the source of the primary frequency.

The terminal therefore knows the primary color and the secondary color of the cell that sent the signal whose level it has measured. Assume that the six level measurements LB2, LC3, LD2, LE1, LG2, LF1 come from the cells B2, C3, D2, E1, G2, F1, respectively.

Moreover, because a pattern of re-use with three cells is used for the sets of secondary frequencies, the situation is the usual one in which at least one frequency of any set of secondary frequencies is adjacent at least one frequency of each of the other two sets of secondary frequencies. This is the result of a rational distribution of the available frequencies.

Referring to FIG. 2, the system according to the invention therefore includes a first memory RXLEV which stores one record per measurement. Each record contains the cell concerned, for example A1, and the level LA1 received from that cell.

If the sets of secondary frequencies were not all adjacent, either because of a pattern with a lower rate of re-use or because of a different distribution of the frequencies of the network, it would naturally be necessary to provide additional information in the memory RXLEV.

The system also includes a digital processor DP responsible for generating the carrier-to-interference ratio in one or other of the cells for which measurements are performed by the terminal. Using a first address signal AD1, the processor searches a first data signal X1 from the memory RXLEV for the reference cell whose carrier-to-interference ratio is to be searched for. This is the local cell A1, for example. The level LA1 received from that cell is then stored in a variable S.

After resetting the variables N1 and N2 to zero, the processor then examines all the other records.

The received level is added to the variable N1 if the cell in a record has the same secondary color 1 as the reference cell.

The received level is added to the variable N2 if the cell in a record has a secondary color which indicates that the corresponding set of secondary frequencies is adjacent that of the reference cell, i.e. if that secondary color is different from that of the reference cell in this example.

The various variables have the following values when all of the memory RXLEV has been scanned:

$$S = LA1$$

$$N1 = LE1 + LF1$$

$$N2 = LB2 + LC3 + LD2 + LG2$$

The variable N1 represents the interference caused by links using the same frequencies as the reference cell and the variable N2 represents the interference caused by links using frequencies adjacent those of the reference cell.

This is because the channel filter is not perfect and so when the terminal is tuned to a selected frequency it also receives adjacent frequencies, which are subject to an attenuation coefficient $\alpha$.

The processor therefore produces a provisional estimate of the carrier-to-interference ratio ER in the reference cell, as follows:

$$ER = \frac{S}{N1 + \alpha N2} \quad (1)$$

In the case of the local cell, the value of this ratio is:

$$ER = \frac{LA1}{LE1 + LF1 + \alpha(LB2 + LC3 + LD2 + LG2)}$$

The invention also establishes a provisional estimate of the carrier-to-interference ratio in any other cell in which the terminal has performed measurements.

Accordingly, choosing the cell B2 as the reference cell:

$$S = LB2$$

$$N1 = LD2 + LG2$$

$$N2 = LA1 + LC3 + LE1 + LF1$$

$$ER = \frac{LB2}{LD2 + LG2 + \alpha(LA1 + LC3 + LE1 + LF1)}$$

The expression for the carrier-to-interference ratio obtained from equation (1) represents a preferred embodiment of the invention.

However, the invention applies equally if no account is taken of the interference N2 caused by links using frequencies adjacent those of the reference cell, which amounts to considering that the value of the attenuation coefficient a is zero. This reduces the complexity of the system at the price of reducing the accuracy of the estimate, which can be expressed in the following terms:

$$ER = S/N1 \quad (2)$$

If equation (2) is used to estimate the carrier-to-interference ratio in the cell C3, the value of the variable N1 is zero and the ratio takes an aberrant value. This is because it is inconceivable that there is no interference and it is therefore necessary to fix a noise floor P below which the actual noise cannot fall.

The simplest solution is to adopt a predetermined value which reflects the reality of the network. That value can be established empirically or by simulation, for example.

Another solution is to consider the noise floor to be equal to the lowest of the levels received from all the cells, excluding the level received from the reference cell. If the expression $N1+\alpha N2$ in equation (1) were also zero, it would naturally be necessary to use a noise floor again.

It is even feasible that it could be judicious to use a noise floor if the variable N2 is zero and the variable N1 is non-zero.

It is necessary to adopt as the noise level the sum of the potential noise, which is either N1 or $(N1+\alpha N2)$, and the noise floor P, which is subject to a weighting coefficient k. The result is a linear combination of the variables N1, N2 and the noise floor P.

The value of the potential noise is therefore $(N1+\alpha N2+kP)$ if account is taken of the adjacent frequencies. Generally, if the noise floor P is below $(N1+\alpha N2)$, the weighting coefficient k is forced to zero and the provisional estimate takes the value $ER=S/(N1+\alpha N2)$. Otherwise the value of this estimate is $ER=S/kP$.

In contrast, if the adjacent frequencies are not taken into account, the value of the provisional estimate ER is either S/N1 or S/kP, depending on whether the noise floor is above or below the potential noise N1.

It is in fact desirable to assign a non-zero value to the weighting coefficient k if the variable N1 is zero, but this is equally possible if the variable N1 or N2 is zero or the variables N1 and N2 are both zero.

The processor DP therefore stores the cell concerned in a secondary memory SN, using a second address signal AD2 and a second data signal X2, together with the estimate of its carrier-to-interference ratio.

The system can be part of the terminal, since the terminal performs the measurements needed to compute the provisional estimate.

The system can instead be part of the network, base station or base station controller, provided that the terminal retransmits the measurements that it performs.

What is claimed is:

1. A system for provisionally estimating the carrier-to-interference ratio of a terminal in a cellular mobile radio network which transmits sets of primary frequencies and sets of secondary frequencies and in which the rate of re-use of the sets of secondary frequencies is higher than that of the sets of primary frequencies and each cell is identified by a primary color (A, B, C, . . . , G) and a secondary color (1, 2, 3) respectively corresponding to the set of primary frequencies and to the set of secondary frequencies which are allocated to it, the system being characterized in that, knowing the level received by said terminal from a local cell (1) to which it is connected and knowing the levels (LB2, LC3, LD2, LE1, LG2, LF1) received by said terminal from adjoining cells (B2, C3, D2, E1, G2, F1) of different primary color to that of said local cell (A1), the system selects a reference cell (B2) from said local cell and said adjoining cells, produces a potential noise including the sum (N1) of said levels (LD2, LG2) received from the cells (D2, G2) of the same secondary color as said reference cell (B2) without taking account of the level (LB2) received from that reference cell (B2), determines a noise level by summing said potential noise (N1) and a noise floor (P) subject to a weighting coefficient and supplies said provisional estimate of the carrier-to-interference ratio of the terminal in said reference cell (B2) by dividing the level received from that reference cell by said noise level.

2. A system according to claim 1, characterized in that, knowing also the levels received by the terminal from surrounding cells (A1, C3, E1, F1) identified as using secondary frequencies adjacent those used by said reference cell (B2), and the network being designed so that a received adjacent frequency is allocated a predetermined attenuation coefficient, said potential noise is increased by the product of said attenuation coefficient ($\alpha$) and the sum (N2) of the levels (LA1, LC3, LE1, LF1) received from said surrounding cells (A1, C3, E1, F1).

3. A system according to any one of claims 1 or 2, characterized in that said weighting coefficient is zero if the sum (N1) of the levels (LD2, LG2) received from the adjoining cells with the same secondary color as said reference cell (B2) is non-zero.

4. A system according to any one of claims 1 or 2, characterized in that said weighting coefficient is non- zero if the sum (N1) of the levels (LD2, LG2) received from the adjoining cells with the same secondary color as said reference cell (B2) is zero.

5. A system according to any one of claims 1 or 2, characterized in that said noise floor (P) is equal to the lowest of said received levels excluding the level (LB2) received from said reference cell (B2).

6. A system according to any one of claims 1 or 2, characterized in that if the network provides a separate beacon frequency in each set of primary frequencies the level received from one of said adjoining cells is measured on the beacon frequency allocated to it.

7. A system according to any one of claims 1 or 2, characterized in that the level received from an adjoining cell is identified by the primary color and the secondary color of that cell.

8. A system according to any one of claims 1 or 2, characterized in that it is part of said terminal.

9. A system according to any one of claims 1 or 2, characterized in that it is part of said network.

* * * * *